United States Patent [19]

Yeo

[11] 4,188,521
[45] Feb. 12, 1980

[54] APPARATUS FOR WELDING AN END PLUG IN A NUCLEAR FUEL TUBE

[75] Inventor: Denis Yeo, Columbia, S.C.

[73] Assignee: Westinghouse Electric Corp., Pittsburgh, Pa.

[21] Appl. No.: 824,592

[22] Filed: Aug. 15, 1977

[51] Int. Cl.² .............................................. B23K 37/04
[52] U.S. Cl. .................... 219/60 A; 219/72; 219/124.34; 219/124.4
[58] Field of Search ............. 219/60 A, 60 R, 121 R, 219/121 P, 72, 75, 124.34, 124.4, 125.11; 176/79, 68

[56] References Cited

U.S. PATENT DOCUMENTS

| | | | |
|---|---|---|---|
| 3,188,446 | 6/1965 | Ray | 219/60 R X |
| 3,255,336 | 6/1966 | Purcell | 219/125.11 |
| 3,444,351 | 5/1969 | Stehle | 219/124.34 X |
| 3,508,107 | 4/1970 | Jones | 219/124.34 X |
| 3,725,635 | 4/1973 | Fink | 219/121 P |
| 3,828,156 | 8/1974 | Fulks | 219/60 A |
| 3,828,518 | 8/1974 | Silk | 219/60 A |
| 4,003,788 | 1/1977 | Boyko | 176/79 |
| 4,075,454 | 2/1978 | Duncan | 219/137 R |

FOREIGN PATENT DOCUMENTS 2276896  1/1976  France ............... 219/121 EB

*Primary Examiner*—Richard R. Kucia
*Attorney, Agent, or Firm*—J. R. Campbell; Z. L. Dermer

[57] ABSTRACT

Apparatus for precisely positioning the seam on an end of a nuclear reactor fuel rod opposite from a welding electrode in a weld chamber. The circumferential seam is formed by abutting surfaces at the end plug-fuel tube interface, and it is important that the seam be located in an exact position relative to the welding electrode tip. This is accomplished by providing a stop member against which the fuel plug rests during the time an end plug is welded. The distances are chosen such that when the end plug is fully seated in the stop member, the electrode tip and seam will be located in optimum positions to effect the making of high quality welds. Open communication is established between the inside of the fuel rod and vacuum equipment which is used for evacuating the fuel rod of air or other gases during the welding operation through an axial passageway in the stop member. When evacuation is complete and the pressure drops to a predetermined low value, a vacuum switch responding to fuel rod pressure acts to close an electrical circuit which energizes the welding electrode. If the end plug is not properly seated in the step member, the desired vacuum cannot be drawn, the vacuum switch will not close, thus precluding initiation of the welding process.

5 Claims, 3 Drawing Figures

APPARATUS FOR WELDING AN END PLUG IN A NUCLEAR FUEL TUBE

CROSS REFERENCES TO RELATED APPLICATIONS

The disclosure in U.S. application Ser. No. 612,112 now U.S. Pat. No. 4,075,454, filed Sept. 10, 1975 in the name of R. Duncan et al. entitled "Process and Apparatus for Sealing Nuclear Reactor Fuel Rods" and assigned to the same assignee as the present invention, relates to the invention in this application.

BACKGROUND OF THE INVENTION

The invention described herein relates to nuclear reactor fuel rods and more particularly to an improved apparatus and process for welding an end plug in the end of a reactor fuel rod.

As is well known in the art, after nuclear fuel pellets are loaded into a fuel tube, end plugs then placed in opposite ends of the tube are appropriately welded to the tube at the seam formed by abutting surfaces at the end plug-fuel tube interface to thus form a fuel rod. One of the plugs has an axial opening therein to permit evacuating the fuel rod of gases prior to commencement of and during the welding operation. Upon completion of the girth weld at the seam, the axial opening in the plug is welded shut in a pressure chamber to maintain the internal area of the fuel rod under a high pressure.

According to current practice, the end plug is welded onto the fuel tube by inserting the plugged tube into a weld chamber and against a rotary stop therein, the distances being arranged such that the welding electrode tip is located at a fixed point relative to the tube-plug seam or joint. At present, this point is located on the plug and approximately 0.030 inch away from the tube-plug seam in order to comply with established, qualified weld parameters. It has been determined that in the event the fuel rod is not accurately positioned in the stop member in the weld chamber, a small displacement away from the end plug-fuel tube seam adversely affects the amount of weld penetration into the metal at the seam. Analysis of the welding operations carried out show that on occasion, the welding operator does not push the end plug firmly against the stop in the welding chamber. As a result, girth welds made in an area which falls outside that area where effective welds are obtained, often results in a defective weld because the amount of penetration is not sufficiently great to provide a tight seal at the end plug-fuel tube seam or joint.

According to conventional practices, a rotating chuck grasps and rotates the fuel rod during the time the girth weld is being made. It has been found that after the chuck grasps the fuel rod, there is a tendency for the chuck to pull the fuel rod away from the stop member against which the fuel rod end plug has been placed. This action results in an unwanted displacement, and in some instances, a displacement of as much as 0.006 inch away from the seam, has resulted in defective welds because proper weld penetration does not occur at the fuel tube-end plug interface.

SUMMARY OF THE INVENTION

Briefly stated, the above disadvantages of the prior art are eliminated by accurately positioning a stop member and an electrode with respect to one another in a weld chamber. The stop member is designed to accept the complementary surface of the fuel tube-end plug, and when the plug is bottomed in the stop member, the circumferential seam or joint formed by a shoulder on the fuel plug abutting the end of the fuel tube in which it is inserted, lies within about 0.030 inch of the electrode tip. To help assure intimate contact between the plug and stop member, and thus precisely position the plug-tube seam under the electrode, the stop member is equipped with an axial passageway which is in alignment with an axial opening extending through the plug, thus establishing communication between the inner portions of the fuel tube and vacuum equipment adapted to be connected to the passageway in the stop member. The vacuum system is appropriately connected to the circuit which energizes the welding electrode, the arrangement being such that the electrode is not energized until a certain degree of vacuum is drawn on the inner portions of the fuel tube.

BRIEF DESCRIPTION OF THE DRAWINGS

While the specification concludes with claims particularly pointing out and distinctly claiming the invention, it is believed the invention will be better understood from the following description taken in connection with the accompanying drawing wherein:

DESCRIPTION OF THE PREFERRED EMBODIMENT

Figure 1:
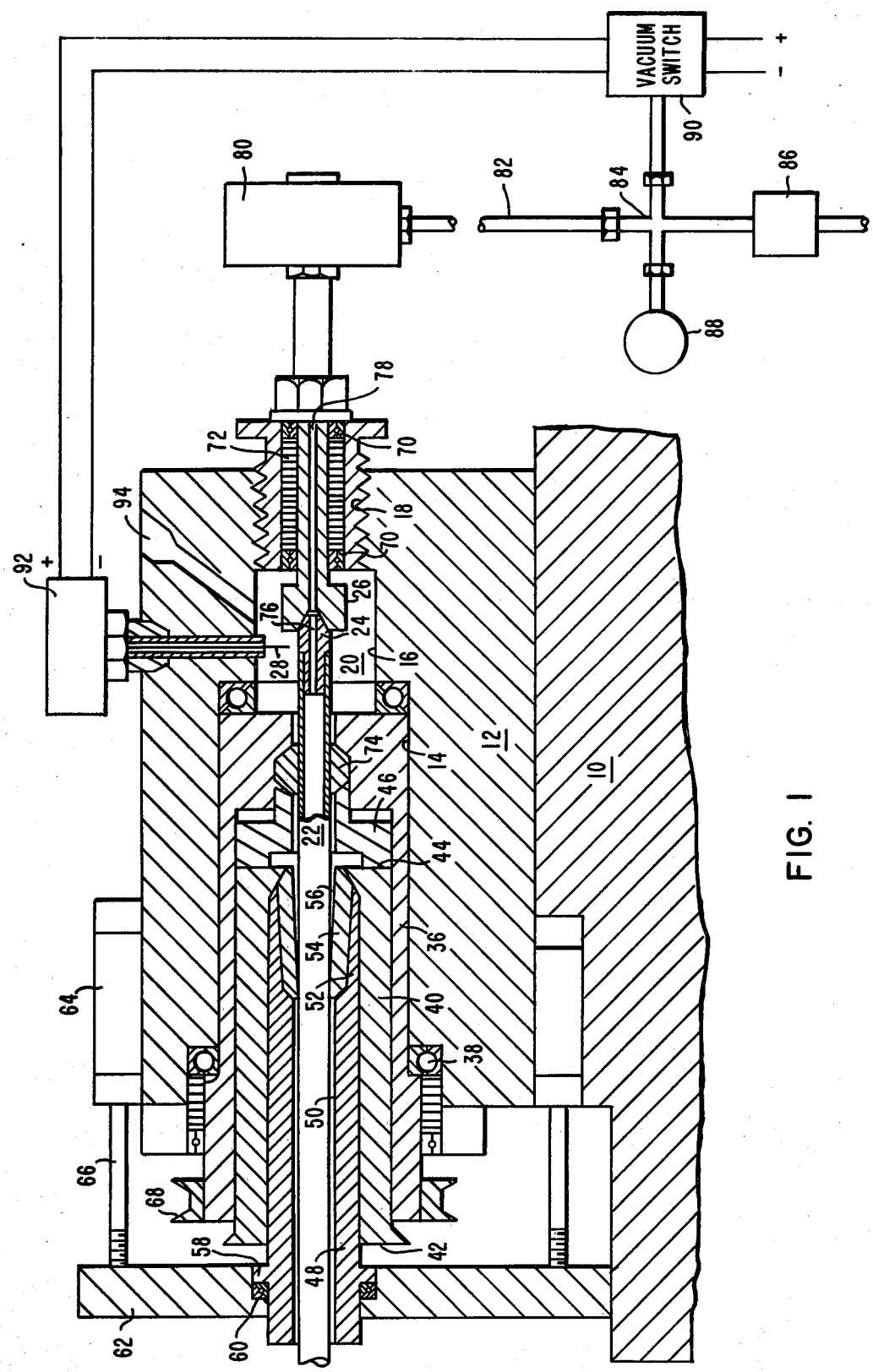
FIG. 1 is a view in elevation, illustrating the arrangement used for precisely positioning the circumferential seam formed by a fuel tube and end plug in a weld chamber.
Figure 2:
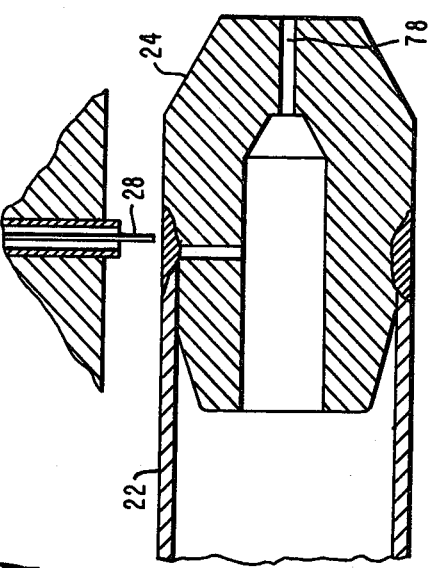
FIG. 2 is an enlarged view in elevation, partly in section, showing the relative position of an electrode tip to the fuel rod parts to be welded.
Figure 3:
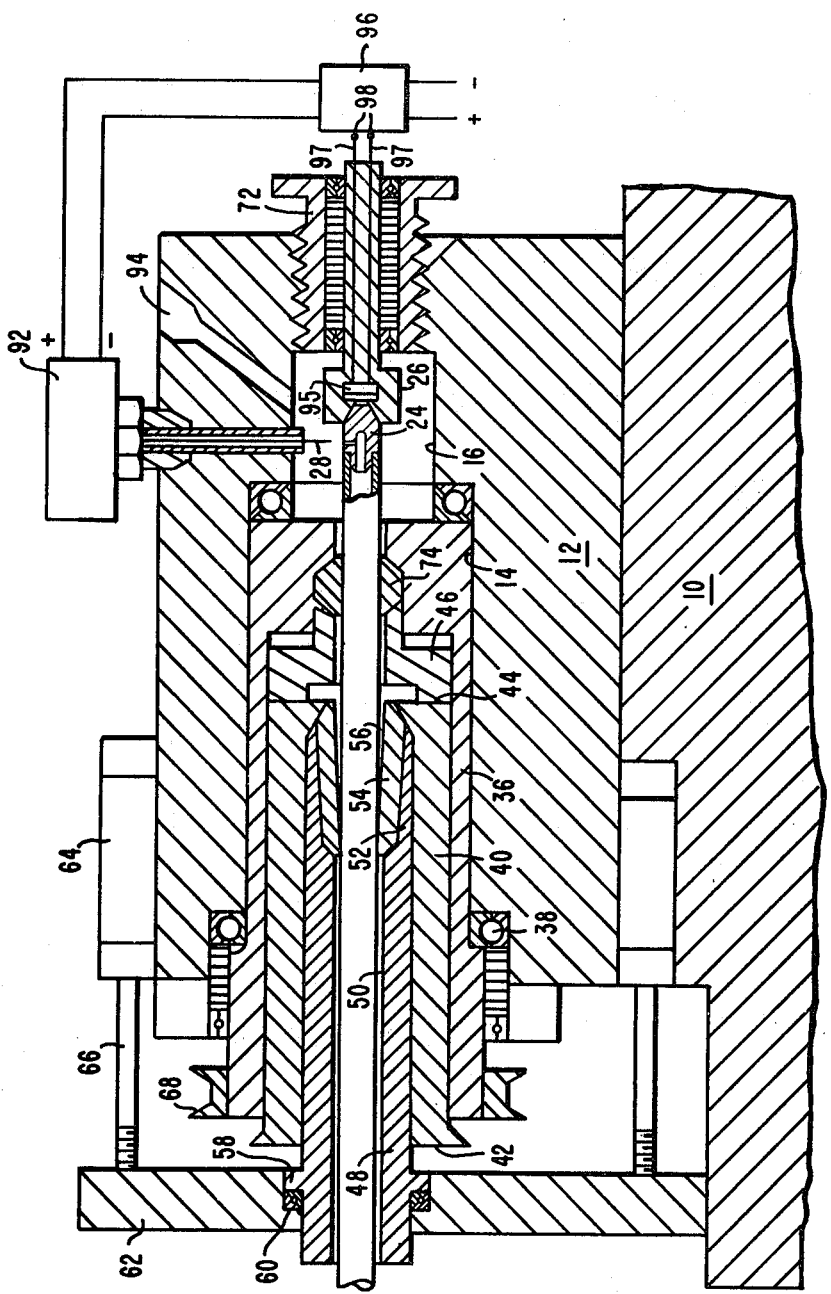
FIG. 3 is a modification of the invention shown in FIG. 1.

Referring now to the drawings wherein like reference characters designate like or corresponding parts throughout the several views, there is shown in FIG. 1, apparatus for assuring that a fuel rod end plug will be snugly fitted in complementary openings of a fuel rod stop member in order to precisely locate the fuel tube-end plug seam with respect to an electrode tip. The apparatus comprises a base 10 which supports a square or cylindrical housing 12 having a machined bore 14 which merges into a bore of lesser diameter 16, and then into an internally threaded section 18. The walls of the bore 16 serve to form a gas chamber 20 into which the end of a fuel rod 22 is inserted. The fuel rod 22 is closed by a plug 24 frictionally fitted into an open end thereof and the end of the plug 24 is arranged to seat in a complementary opening formed in the end surface of a stop member 26. According to customary practices, an electrode 28 serves to weld the end plug to the fuel tube 22 circumferentially at the joint or seam made by the abutting surfaces of the plug and tube. The components located in bore 14 serve to both grasp and rotate the fuel rod 22 during the time of making the girth weld while simultaneously sealing the gas chamber 20.

Although these components are of well known design, it will be seen that a rotatable sleeve 36 fits in bore 14 and rotates therein on a pair of bearings 38. A push rod 40 positioned in rotatable sleeve 36 is provided with enlarged end faces 42, 44, the face 44 being arranged to selectively engage ram 46 located in the end of sleeve 36. Collet holder 48 has a bore 50 which merges into a conical opening formed by diverging walls 52. A collet 54 equipped with an axial opening 56 is positioned within the collet holder conical walls 52, the diameters being such that the fuel rod 22 may be inserted through the central openings in the collet holder, collet and ram 46 in the manner shown in FIG. 1. Rotatable sleeve 36 is keyed to push rod 40 and ram 46 which permits rotation of these elements as a single entity.

As shown on the left side of FIG. 1, the collet holder 48 is provided with a radially extended flange 58 which bears against thrust bearing 60 positioned in a backing plate 62. Pneumatic or hydraulic cylinders 64 each having a reciprocating piston therein are connected to backing plate 62 through connecting rods 66, the arrangement being such that as the pistons in the pneumatic or hydraulic cylinders are moved to the right, as shown in FIG. 1, the backing plate 62 engages flange surfaces 42 on the collet holder which forces the collet holder to the right to cause the collet 54 to capture the fuel rod 10 and thus hold it in an immovable position. This action also serves to move the fuel rod end plus into intimate contact with complementary surfaces on the stop member to help assure locating the fuel rod seam in a precise position with respect to the electrode tip 28. Such movement to the right also causes ram 46 to squeeze the urethane seal 74 tightly around the fuel rod surfaces and thus prevent leakage of gas from the gas chamber 20 during the welding operation. The fuel rod is then rotated by pulley 68 connected to a motorized drive, not shown. To minimize friction between the fuel rod plug 24 and stop member 26 during fuel rod rotation, the stop member is mounted on bearings 70 which thus permits the fuel rod and stop member to rotate in unison. Ferro-fluidic seals 72 also prevent leakage of gas from the welding chamber.

Although a specific design of weld chamber has been disclosed, it will be apparent that other designs which simply utilize a weld chamber including a seal therein, through which an end of a fuel rod extends, and wherein the fuel rod is rotated by a motor during welding, may just as well be used.

As indicated above, it is essential that the electrode tip be located within about 0.030 inches of the tube-end plug seam in order to comply with established, qualified weld parameters and to produce reliable welded joints of high integrity. It is known that if the electrode tip is displaced even a small distance from its desired point, the weld penetration at the seam is inadequate. Since the fuel rod is manually located in the fuel chamber, together with assistance from the collet holder, and in a position where the fuel rod plug is in intimate contact with the complementary surfaces on the stop member, discrepancies in the location of the weld will occur in the event the rod is not accurately placed in position and bottomed out in the stop member. Also, even though the welding operator pushes the rod with its attached end plug against the stop every time, there is always the possibility that the plug end of the rod may be drawn away from its position immediately under the welding electrode. This results from the fact that since most fuel rods are rotated by a rotating chuck, a tendency exists for the chuck to pull the rod away from the stop member upon the initiation of fuel rod rotation, and that in some cases, a displacement of as much as 0.006 inches has been measured and this amount may well result in a defectively welded fuel rod. Also, it is important to note that poor welds resulting in under-penetration of the weld material is not easily detected by radiographs and it therefore is imperative that the weld be in proper location every time; otherwise, a rod with weld under-penetration could inadvertently be installed in the reactor with the real possibility existing of a weld failure taking place during the time of reactor operation.

The invention described herein overcomes the above disadvantages by utilizing a vacuum switch installed in a vacuum line leading to the stop member which is engaged by the fuel rod end plug. During evacuation of the fuel rod, as the vacuum arises to a predetermined level, thus indicating that the fuel rod end plug is bottomed out in the stop member and is in a precise correct location relative to the welding electrode in the gas chamber, the vacuum switch acts to close the electrical circuit to the electrode thus initiating the welding process. The structure employed for carrying out these functions includes a passageway 76 in the end plug which establishes communication between the atmosphere and the internal areas of fuel rod 22. A similar passageway 78 formed centrally in the stop member 26 leads through a junction box 80 and pipe 82 to a connector 84. A flow meter 86 and vacuum gauge 88 is connected to the connector 84 together with a vacuum switch 90. The vacuum switch is of conventional and well known design and is arranged to respond to vacuum in the weld chamber and when it reaches a predetermined low value, the switch closes the circuit from an electrical source and provides electric power to the unit 92 which supplies the electrode 28.

OPERATION

When it is desired to weld an end plug 24 in the end of a fuel tube 22, the tube is manually pushed through collet holder 48 and advanced to the point where the end plug bottoms out in the stop member. Since the end plug surface snugly engages the complementary opening formed in stop member 26, the operator is assured that the fuel tube-end plug seam is correctly positioned with respect to the welding electrode. The plate 62 is moved to the right as shown in FIG. 1 thus causing the collet holder to grasp the fuel rod 22, and during the time it is advancing, ram 46 moves to the right to squeeze urethane seal 74 tightly around the fuel tube surface. At that time, the drive means then causes rotation of the fuel rod through pulley 68. About the same time, the evacuator or vacuum pump 86 draws a vacuum in the lines 82 and passageway 78, 76 thereby reducing the pressure in the fuel rod 22. Also, to provide an inert atmosphere for the welding operation, helium gas under a slight pressure is caused to flow from inlet 94 through the weld chamber to help assure the maintenance of an inert atmosphere. As the vacuum pump continues to draw down the fuel rod, when a predetermined low vacuum is reached, the vacuum switch closes the circuit to the welding unit 92 and electrode 28 to thus commence the welding operation.

In the event the fuel rod end plug is not bottomed out in the stop member, helium will flow from the gas chamber through the space between the outside surface of the end plug and the complementary opening in the stop member 26. This leakage of helium into the passageway 78 and lines 82 precludes establishment of the necessary vacuum, and as a result, the vacuum switch does not close the circuit to the electrode and welding will not take place. Therefore, no end plug can be welded into the fuel tube unless the end plug is properly seated in the stop member 26, and it is this seated position which dictates whether the electrode 28 is located at the precise correct position relative to the fuel tube-end plug seam or joint.

In a modification, the stop member 26 includes a central cavity which houses a continuity switch 95 adapted to be contacted by the end of the fuel tube-end plug 24 when the fuel rod is manually placed in position in the welding chamber. The switch is connected to relay 96 through conductors 97 and slip rings 98, the slip rings being necessary because the stop member 26 housing the switch rotates during the welding operation. It will be evident that when the end plug 24 contacts and closes the continuity switch, a circuit is completed to relay 96 when this closes and supplies electric power to the welding apparatus 92 and electrode 28. Also, the distances are arranged such that at the precise point of engagement of the end plug with the continuity switch, the fuel tube-end plug seam is located within 0.030 of the stationary electrode in the weld chamber. To assure proper weld penetration, the electrode desirably is positioned over the end plug side of the seam.

Alternatively, it will be apparent that the stop member 26 may be moved axially by the end of the fuel rod when engaged by the fuel rod plug to close a continuity switch which may be located in the relay 96.

It will be apparent that many modifications and variations are possible in light of the above teachings. It therefore is to be understood that within the scope of the appended claims, the invention may be practiced other than as specifically described.

I claim:

1. Apparatus for controlling the position of a fuel tube-end plug seam on a fuel rod relative to a stationary welding electrode in a welding chamber comprising:
   a housing having a welding chamber therein, said chamber being arranged to communicate with a bore in the housing which contains means for grasping and rotating a fuel rod and for sealing the end plug side of the fuel rod in the welding chamber to thereby prevent leakage of gas therefrom during a welding operation;
   a stop member in said welding chamber positioned to be engaged by the end plug on said fuel rod, the distance being arranged such that when the end plug is seated in the stop member, the fuel tube-end plug seam is precisely positioned with respect to a stationary electrode in the welding chamber;
   fuel rod position detecting means connected to said stop member for sensing the position of said rod in the stop member, and for assuring that the plug is located in said precise position with respect to said electrode before commencement of the welding process; and
   said detecting means being operatively connected to an electric circuit and said electrode for selectively energizing the electrode when the detecting means senses that the fuel tube-end plug seam is in said precise position for welding.

2. Apparatus according to claim 1 wherein said detecting means includes a relay in said electric circuit connected to said electrode so that when the fuel rod end plug is in its precise position in said stop member, said relay is actuated to energize said electrode.

3. Apparatus according to claim 2 wherein an axial opening extends through said fuel rod end plug and leads into the inside of said fuel rod;
   a second axial opening in said stop member in alignment with the axial opening in said end plug, so that when said end plug is positioned in the stop member, the axial openings are coextensive with each other;
   means including a vacuum line connected to a vacuum source for drawing a vacuum on said fuel rod; and
   said fuel rod position detecting means connected to said stop member includes a vacuum switch located in said vacuum line, said switch being responsive to the pressures in said axial openings and fuel rod and is actuated to connect the electric circuit with said electrode when the pressure reaches a predetermined low level.

4. Apparatus according to claim 2 wherein said detecting means connected to the stop member for assuring that the end plug is located in said precise position includes a continuity switch located in said stop member and in a position to be contacted by the end of said fuel rod end plug; and
   means connecting said switch with said relay in an electric circuit which provides electric power to said electrode when the switch is contacted by and closed by said end plug.

5. Apparatus according to claim 3 including means connected with said housing for circulating an inert gas through said welding chamber during the welding operation, so that if the end plug is not precisely positioned in said stop member, the inert gas will be drawn into the vacuum line and thus preclude the pressure from reaching the predetermined low value.

* * * * *